United States Patent [19]
Ripplinger

[11] 3,766,475
[45] Oct. 16, 1973

[54] SILICON CONTROLLED RECTIFIER TESTER

[75] Inventor: Roland E. Ripplinger, Phoenix, Ariz.

[73] Assignee: Honeywell Information Systems Inc., Waltham, Mass.

[22] Filed: Sept. 21, 1972

[21] Appl. No.: 291,121

[52] U.S. Cl. .................. 324/158 SC, 324/158 D
[51] Int. Cl. ............................................. G01r 31/22
[58] Field of Search ................. 324/158 SC, 158 T, 324/158 D

[56] References Cited
UNITED STATES PATENTS
3,436,661 4/1969 Gribbons....................... 324/158 SC
3,478,264 11/1969 Tsergas .......................... 324/158 T Primary Examiner—Rudolph V. Rolinec
Assistant Examiner—Ernest F. Karlsen
Attorney—Lloyd B. Guernsey et al.

[57] ABSTRACT

The silicon controlled rectifier tester employs an oscilloscope, a grounded-grid amplifier, a clipping circuit and a pair of cathode followers to rapidly test the operating characteristics of silicon controlled rectifiers. The oscilloscope provides a sawtooth signal voltage which is amplified and applied to a rectifier which is under test. The oscilloscope also provides a record of the operating characteristics of the silicon controlled rectifier.

8 Claims, 2 Drawing Figures

SILICON CONTROLLED RECTIFIER TESTER

BACKGROUND OF THE INVENTION

This invention relates to a silicon controlled rectifier tester and more particularly to a tester which uses a combination of an oscilloscope, a grounded-grid amplifier, a clipping circuit and a pair of cathode followers to rapidly check the dv/dt operating characteristics of silicon controlled rectifiers.

The silicon controlled rectifier is a semiconductor device having an anode, a cathode and a gate. The silicon controlled rectifier can be used as an ON-OFF switch which can be turned on in a very few microseconds. Normally, the silicon controlled rectifier cannot conduct current between anode and cathode thereof until a pulse of current larger than a threshold value flows from gate to cathode. If a positive voltage difference exists between the anode and cathode, when the pulse of current flows from the gate, the silicon controlled rectifier "fires"; i.e., is rendered conductive and current will flow from the anode to the cathode. These silicon controlled rectifiers are widely used to provide d.c. power for operating data processing systems, data communication systems and many other electronic systems. Silicon controlled rectifiers are also used to control the operation of electric motors, to convert from d.c. to a.c., to control light intensity in light dimming circuits and in a variety of other jobs.

In many of these applications rapidly changing voltages may be applied to silicon controlled rectifiers. The construction of the silicon controlled rectifier causes a capacitance between the anode, the gate and the cathode. Any rapidly changing voltage between the anode and the cathode causes an electric current to flow between the anode and the cathode to charge this anode-cathode capacitance. When the amplitude of this anode to cathode current reaches a threshold value the rectifier fires even without gate-to-cathode current. This undesirable and premature firing of the silicon controlled rectifiers may cause damage to the electric components used in the circuit. It is therefore desirable to test the silicon controlled rectifiers and select rectifiers which will not fire when a predetermined dv/dt or rate of change of voltage is applied between anode and cathode.

Prior art circuits have been developed to test the blocking characteristics of silicon controlled rectifiers when a linearly increasing voltage is applied between the anode and the cathode of the rectifier. These prior art testers employ a plurality of transistors so they are relatively expensive to construct and difficult to use. Prior art testers also require relatively long periods of time to test each of the silicon controlled rectifiers. The present invention alleviates the disadvantages of the prior art by providing a silicon controlled rectifier tester which is relatively inexpensive to construct and which can rapidly test the dv/dt characteristics of a plurality of silicon controlled rectifiers.

It is, therefore, an object of this invention to provide a new and improved circuit for testing the operating characteristics of silicon controlled rectifiers.

Another object of this invention is to provide a circuit for testing the dv/dt characteristics of silicon controlled rectifiers.

A further object of this invention is to provide an inexpensive apparatus for testing the dv/dt characteristics of silicon controlled rectifiers.

Another object of this invention is to provide apparatus which can rapidly check the operating characteristics of a plurality of silicon controlled rectifiers.

SUMMARY OF THE INVENTION

The foregoing objects are achieved in the present invention by providing new and improved silicon controlled rectifier testers which include an oscilloscope, a grounded-grid amplifier, a clipping circuit and a pair of cathode followers to rapidly test the operating characteristics of silicon controlled rectifiers.

Other objects and advantages of this invention will become apparent from the following description when taken in connection with the accompanying drawings.

DESCRIPTION OF THE PREFERRED EMBODIMENT

Figure 1:
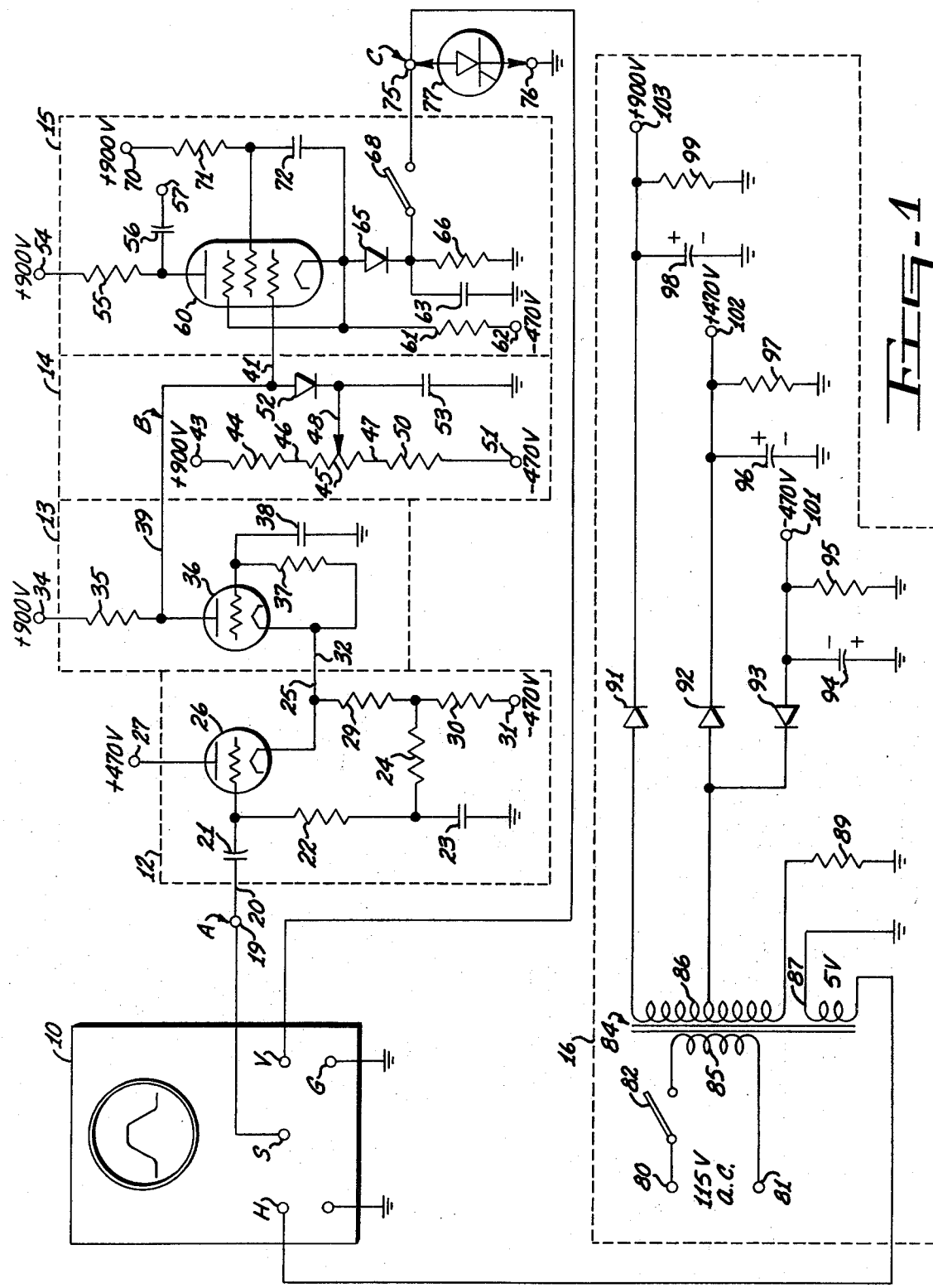
FIG. 1 is a schematic drawing of an embodiment of the present invention.
Figure 2:
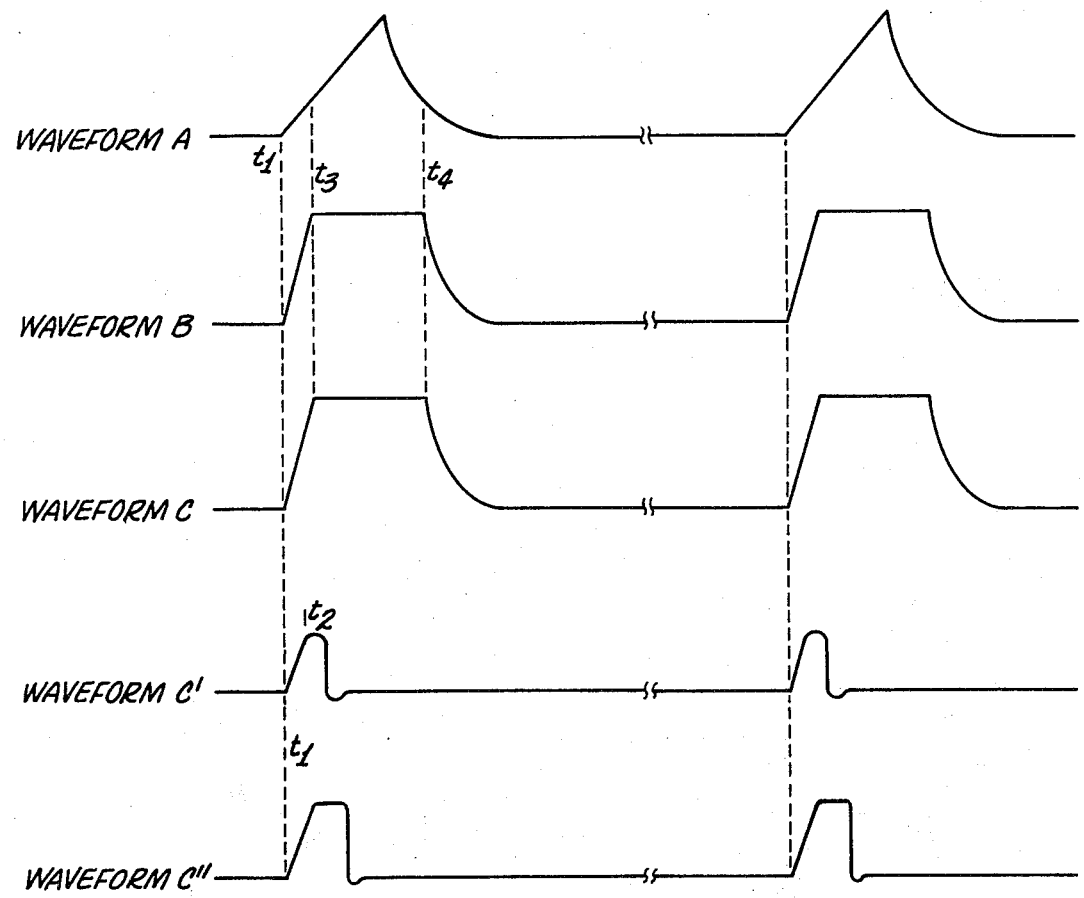
FIG. 2 illustrates waveforms which are useful in explaining the operation of the circuit shown in FIG. 1.

Referring more particularly to the drawings by the characters of reference, FIG. 1 discloses a silicon controlled rectifier tester which includes an oscilloscope 10, a first cathode follower 12, a grounded-grid amplifier 13, a clipping circuit 14, a second cathode follower 15 and a power supply 16. The oscilloscope 10 provides sawtooth signals to the input terminal 19 from the sawtooth or S-terminal of the oscilloscope and also displays operating characteristics of the rectifier on the face of the cathode ray tube. The silicon controlled rectifier being tested is connected between output terminals 75 and 76. Another sawtooth generator may be substituted for the oscilloscope 10 to provide signals to the input terminal 19. Other recording devices may be connected to the output terminals 75 and 76 to record the operating characteristics of the rectifiers. A sawtooth voltage which may be applied to input terminal 19 is shown in waveform A of FIG. 2.

The first cathode follower 12 provides a high input impedance which prevents loading the sawtooth generator and prevents distorting the sawtooth voltage at input terminal 19. The output impedance of cathode follower 12 is relatively low because typical values of the cathodes resistors 29 and 30 are 3,000 ohms each. The signal from output lead 25 of the cathode follower 12 is coupled to input lead 32 of the grounded-grid amplifier 13. This signal is amplified by the grounded-grid amplifier 13 and provided on the output lead 39 of the grounded-grid amplifier. The sawtooth developed by the grounded-grid amplifier 13 is clipped by the clipping circuit 14 at a level which may be selected by the setting of the potentiometer 45. This clipped signal is shown in waveform B of FIG. 2. A sawtooth clipping circuit could be connected to other portions of the tester.

Input lead 46 of the potentiometer is coupled by resistor 44 to the +900 volt potential. Input lead 47 is coupled to a −470 volt potential and the arm of the potentiometer is connected to output lead 48. The signal voltage on the input lead 41 of the second cathode follower may have an amplitude from −50 volts to approximately +600 volts which can be selected by the setting of potentiometer 45. When the voltage on input lead 41 is slightly more positive than the voltage on the arm of the potentiometer diode 50 is rendered conductive. When diode 50 is conductive the voltage on lead 41 can not increase above the voltage at which diode 50 is rendered conductive. The signal voltage on lead 41 causes cathode follower 15 to provide a signal voltage across resistor 66 and across output terminals 75 and 76 when switch 68 is closed. The silicon controller rectifier 77 to be tested is connected between terminals 75 and 76 which are also connected to the vertical input terminals of the oscilloscope 10.

The second cathode follower 15 includes a tube or amplifying device 60 having a plate or anode coupled to a +900 volt potential by resistor 55. The resistor 55 limits the current through tube 60 when the silicon controlled rectifier 77 fires. The grid or control electrode is connected to the signal input lead 41. The cathode of tube 60 is coupled by resistor 61 to a −470 volt potential so the voltage on the cathode is slightly negative when a low value of signal is applied to input terminal 19. At this same time diode 65 is nonconductive so the voltage across resistor 66 is low.

Prior to the time a silicon controlled rectifier is to be tested switch 68 is opened so that terminal 75 is near ground potential. The anode of rectifier 77 is then connected to test terminal 75 and the cathode is connected to test terminal 76. The switch 68 is closed and the sawtooth voltage from terminal 19 is amplified, clipped and applied across the silicon controlled rectifier 77. When rectifier 77 does not fire or breakdown the voltage across the rectifier is as shown in waveform C of FIG. 2.

When the rectifier breaks down the voltage pattern as shown in waveform C' or waveform C'' may be seen on the face of the cathode ray tube of the oscilloscope. In waveform C' the voltage across the rectifier increased only a small amount before the rectifier breaks down causing the rectifier to conduct heavily and causing the voltage across the rectifier to decrease rapidly. In waveform C'' the voltage increases to a value near the desired operating voltage where the rectifier breaksdown. The voltage remains briefly at this level, then decreases rapidly.

The speed of testing silicon controlled rectifiers may be increased by connecting spring clips to test terminals 75 and 76 so that a silicon controlled rectifier may be quickly moved into contact with the clips, switch 68 closed to obtain a pattern on the oscilloscope, switch 68 opened, and the rectifier quickly removed. The duty cycle of the tester should be kept low to prevent heating of the rectifier being tested. This can be done by using a sawtooth having a short duration, followed by a relatively long period before the next sawtooth.

Three voltages for the amplifier portion of the tester and a trigger signal for the horizontal sweep of oscilloscope 10 are provided by the power supply 16. The center tap on secondary winding 86 of transformer 84 provides a +900 volts, a +470 volts and a −470 volts for the amplifier portion of the circuit of the tester. A power supply without secondary winding 87 may be used to provide the voltages shown in FIG. 1; however, better synchronization is provided by having the power supply also develop the trigger signal for the horizontal sweep of the oscilloscope. The voltage across capacitor 98 may vary as the current in the tube 60 of the second cathode follower varies. This variation in voltage across capacitor 98 may cause an erratic pattern on the face of the cathode ray tube if the horizontal sweep of the oscilloscope is not synchronized with the voltage on the secondary windings of transformer 84.

While the principles of the invention have now been made clear in an illustrative embodiment, there will be many obvious modifications of the structure, proportions, materials and components without departing from those principles. The appended claims are intended to cover any such modifications.

What is claimed is:

1. A silicon controlled rectifier tester for use with a voltage-actuated recording device having a signal-input terminal and a ground terminal, said tester comprising:
    a source of linear electric signals;
    first and second cathode followers each having an input lead and an output lead, said input lead of said first cathode follower being connected to said source;
    a grounded-grid amplifier having an input lead and an output lead, said input lead of said amplifier being connected to said output lead of said first cathode follower, said output lead of said amplifier being connected to said input lead of said second cathode follower;
    a clipping circuit, said clipping circuit being connected to said output lead of said amplifier; and
    first and second test terminals, said first test terminal being connected to said output lead of said second cathode follower and to said signal-input terminal of said recording device, said second test terminal being connected to said ground terminal of said recording device.

2. A silicon controlled rectifier tester as defined in claim 1 wherein said clipping circuit includes:
    first, second and third reference potentials;
    a potentiometer having first and second input leads and an output lead, said first input lead of said potentiometer being coupled to said first potential, said second input lead of said potentiometer being coupled to said second potential;
    diode means, said diode means being connected and said output lead of said potentiometer and said output lead of said amplifier; and
    a capacitor, said capacitor being connected between said third potential and said output lead of said potentiometer.

3. A silicon controlled rectifier tester as defined in claim 1 wherein said second cathode follower includes:
    an amplifying device having an anode, a cathode and a control electrode, said control electrode being connected to said input lead of said second cathode follower;
    first, second and third reference potentials;
    first, second and third resistors, said first resistor being connected between said first potential and said anode of said device, said second resistor being connected between said second potential and said cathode of said device;
    a diode having an anode and a cathode, said anode of said diode being connected to said cathode of said device, said third resistor being connected between said third potential and said cathode of said diode; and
    a capacitor, said capacitor being connected between said third potential and said cathode of said diode, said output lead of said second cathode follower being connected to said cathode of said diode.

4. A silicon controlled rectifier tester as defined in claim 1 wherein said clipping circuit and said second cathode follower include:
an amplifying device having an anode, a cathode, and a control electrode, said control electrode being connected to said input lead of said second cathode follower;
first, second and third reference potentials;
a potentiometer having first and second input leads and an output lead, said first input lead of said first potentiometer being coupled to said first potential, said input lead of said potentiometer being coupled to said second potential;
first, second and third resistors, said first resistor being connected between said first potential and said anode of said device, said second resistor being connected between said second potential and said cathode of said device;
first and second diodes each having an anode and a cathode, said anode of said first diode being connected to said cathode of said device, said third resistor being connected between said third potential and said cathode of said first diode, said second diode being connected between said output lead of said potentiometer and said output lead of said amplifier; and
first and second capacitors, said first capacitor being connected between said third potential and said cathode of said first diode, said output lead of said second cathode follower being connected to said cathode of said first diode, said second capacitor being connected between said third potential and said output lead of said potentiometer.

5. A silicon controlled rectifier tester for use with an oscilloscope having horizontal and vertical input terminals, a ground terminal and a sweep output terminal, said tester comprising:
first and second cathode followers each having an input lead and an output lead, said input lead of said first cathode follower being connected to said output terminal of said oscilloscope;
a grounded-grid amplifier having an input lead and an output lead, said input lead of said amplifier being connected to said output lead of said first cathode follower, said output lead of said amplifier being connected to said input lead of said second cathode follower;
a clipping circuit, said clipping circuit being connected to said output lead of said amplifier; and
first and second test terminals, said first test terminal being connected to said output lead of said second cathode follower, said second test terminal being connected to said ground terminal of said oscilloscope, said first test terminal being connected to said vertical terminal of said oscilloscope.

6. A silicon controlled rectifier tester as defined in claim 5 wherein said clipping circuit includes:
first, second and third reference potentials;
a potentiometer having first and second input leads and an output lead, said first input lead of said potentiometer being coupled to said first potential, said second input lead of said potentiometer being coupled to said second potential;
diode means, said diode means being connected between said output lead of said potentiometer and said output lead of said amplifier; and
a capacitor, said capacitor being connected between said third potential and said output lead of said potentiometer.

7. A silicon controlled rectifier tester as defined in claim 5 wherein said second cathode follower includes:
an amplifying device having an anode, a cathode and a control electrode, said control electrode being connected to said input lead of said second cathode follower;
first, second and third reference potentials;
first, second and third resistors, said first resistor being connected between said first potential and said anode of said device, said second resistor being connected between said second potential and said cathode of said device;
a diode having an anode and a cathode, said anode of said diode being connected to said cathode of said device, said third resistor being connected between said third potential and said cathode of said diode; and
a capacitor, said capacitor being connected between said third potential and said cathode of said diode, said output lead of said second cathode follower being connected to said cathode of said diode.

8. A silicon controlled rectifier tester as defined in claim 5 wherein said clipping circuit and said second cathode follower include:
an amplifying device having an anode, a cathode, and a control electrode, said control electrode being connected to said input lead of said second cathode follower;
first, second and third reference potentials;
a potentiometer having first and second input leads and an output lead, said first input lead of said first potentiometer being coupled to said first potential, said input lead of said potentiometer being coupled to said second potential;
first, second and third resistors, said first resistor being connected between said first potential and said anode of said device, said second resistor being connected between said second potential and said cathode of said device;
first and second diodes each having an anode and a cathode, said anode of said first diode being connected to said cathode of said device, said third resistor being connected between said third potential and said cathode of said first diode, said second diode being connected between said output lead of said potentiometer and said output lead of said amplifier; and
first and second capacitors, said first capacitor being connected between said third potential and said cathode of said first diode, said output lead of said second cathode follower being connected to said cathode of said first diode, said second capacitor being connected between said third potential and said output lead of said potentiometer.

* * * * *